US006816184B1

(12) United States Patent
Brill et al.

(10) Patent No.: US 6,816,184 B1
(45) Date of Patent: Nov. 9, 2004

(54) METHOD AND APPARATUS FOR MAPPING A LOCATION FROM A VIDEO IMAGE TO A MAP

(75) Inventors: Frank Z. Brill, Plano, TX (US); Bruce E. Flinchbaugh, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 662 days.

(21) Appl. No.: 09/292,499

(22) Filed: Apr. 15, 1999

Related U.S. Application Data
(60) Provisional application No. 60/083,711, filed on Apr. 30, 1998.

(51) Int. Cl.$^7$ ............................. H04N 7/18; H04N 9/47
(52) U.S. Cl. ...................................................... 348/143
(58) Field of Search .................................. 348/143, 147, 348/161, 169; 382/103, 209, 276, 277, 289, 291, 293, 294, 295, 305, 282; 345/629

(56) References Cited

U.S. PATENT DOCUMENTS

| | | | | |
|---|---|---|---|---|
| 4,943,854 | A | | 7/1990 | Shiota et al. ................ 358/108 |
| 5,111,291 | A | | 5/1992 | Erickson et al. ............. 358/108 |
| 5,491,511 | A | | 2/1996 | Odle ........................... 349/153 |
| 5,768,447 | A | * | 6/1998 | Irani et al. ................... 382/305 |
| 5,771,102 | A | * | 6/1998 | Vogt et al. ................... 358/433 |
| 5,917,469 | A | * | 6/1999 | Matsushita ................... 345/629 |
| 6,097,853 | A | * | 8/2000 | Gu et al. ...................... 382/282 |
| RE37,222 | E | * | 6/2001 | Yonemitsu et al. ..... 375/240.16 |
| 6,396,961 | B1 | * | 5/2002 | Wixson et al. ............... 382/294 |

OTHER PUBLICATIONS

Patent Application Ser. No. 08/795,423, filed Feb. 5, 1997.
Patent Application Ser. No. 08/866,789, filed May 30, 1997.
Jonathan D. Courtney, "Automatic Video Indexing via Object Motion Analysis", *Pattern Recognition*, Apr., 1997, cover page and pp 1–31.

(List continued on next page.)

*Primary Examiner*—Chris Kelly
*Assistant Examiner*—Behrooz Senfi
(74) *Attorney, Agent, or Firm*—Robert D. Marshall, Jr.; W. James Brady, III; Frederick J. Telecky, Jr.

(57) ABSTRACT

A monitoring system (10) includes a video camera (12) which generates images of a monitored area. A computer (16) receives the images from the video camera, and contains a digitized map (85) of the monitored area. One of the detected images (84) is saved as a reference image. An operator defines a first region (86) corresponding to a selected portion of the monitored area, as viewed in the reference image, and defines a second region (87) which corresponds to the selected portion of the area as viewed on the map. Subsequent images from the camera are compared to the reference image, in order to identify an object of interest, and a first point associated with the object is identified. If the first point is within the first region, a warp transformation of the first point from the first region to the second region is carried out, in order to identify within the second region a second point which corresponds to the first point, and which identifies the location on the map of the object of interest.

22 Claims, 5 Drawing Sheets

OTHER PUBLICATIONS

Niyogi, et al., "Analyzing and Recognizing Walking Figures in XYT", 1994 IEEE, pp. 469–474.

Wren, et al., "Pfinder: Real-Time Tracking of the Human Body", M.I.T. Media Laboratory Perceptual Computing Section Technical Report No. 353, published in SPIE 1995 vol. 2615, pp. 1–9.

Turk, et al., "Eigenfaces for Recognition", 1991 Massachusetts Institute of Technology, Journal of Cognitive Neuroscience vol. 3, No. 1, pp. 71–86.

Flinchbaugh, et al., "Autonomous Scene Monitoring System", pp. 205–209.

Norris, et al., "Algorithmic Surveillance–The future of automated visual surveillance", CCTV, Surveillance and Social Control Conference, Jul. 9, 1996, pp. 1–21.

Jonathan D. Courtney, "Automatic Object–Based Indexing for Assisted Analysis of Video Data", (1995) pp. 1–25.

Bruce Flinchbaugh, "Robust Video Motion Detection and Event Recognition", May 11, 1997, pp. 51–54.

Kashi Rao, "A Computer Vision System to Detect 3-D Rectangular Solids", 6 unnumbered pages.

Jain, et al., "Segmentation through the Detection of Changes Due to Motion", Computer Graphics and Image Processing 11, (1979), pp. 13–34.

"DTS–1000 DTS–1000 VB Video Motion Detection & Tracking System" Stellar Security Products Incorporated, 4 unnumbered pages, 1995.

Olson, et al., "Moving Object Detection and Event Recognition Algorithms for Smart Cameras", May 11, 1997, pp. 159–175.

* cited by examiner

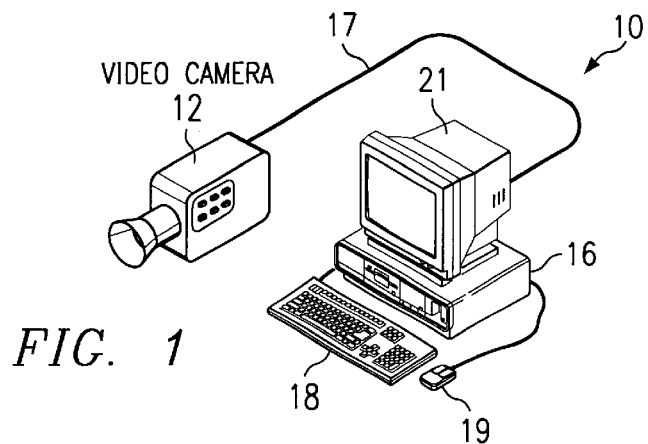
*FIG. 1*
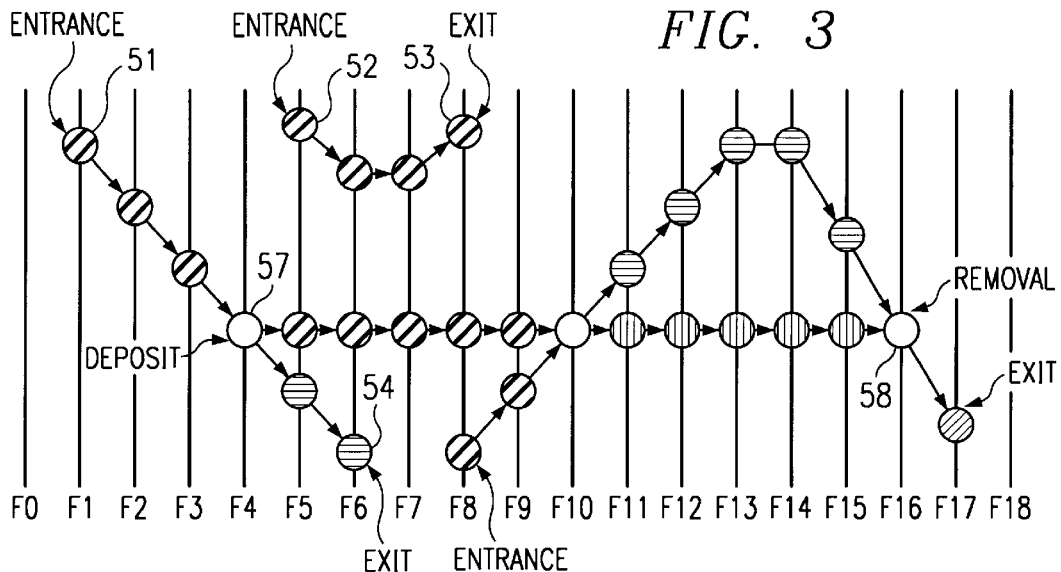
*FIG. 3*
*FIG. 8*
| Events: | ☐ enter ☐ exit ☐ loiter ☒ deposit ☐ remove ☐ move ☐ rest ☐ lightsout |
| Objects: | ☐ person ☐ box ☒ briefcase ☐ notebook ☐ monitor ☐ object ☐ unknown |
| Regions: | ☒ Z |
| Duration: | 5 |
| Actions: | ☐ beep ☐ log ☐ popup ☒ voice |
[cancel] [OK]

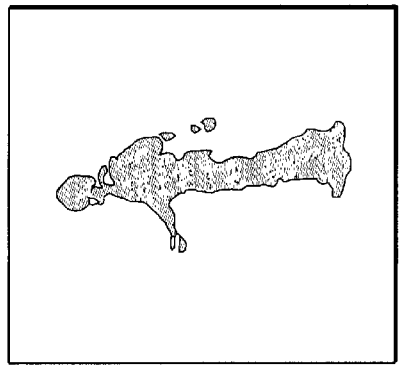
FIG. 2D
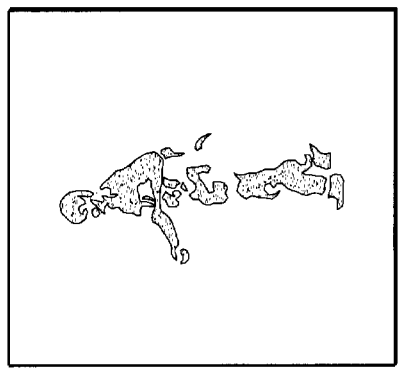
FIG. 2C
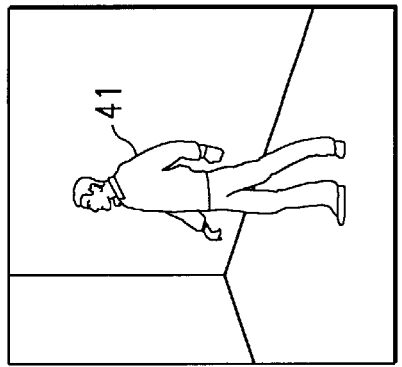
FIG. 2B
FIG. 2A
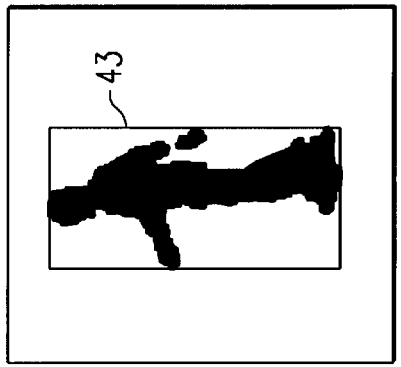
FIG. 2H
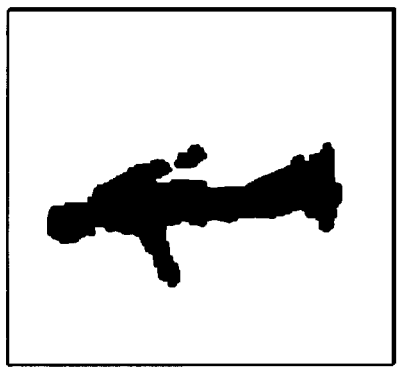
FIG. 2G
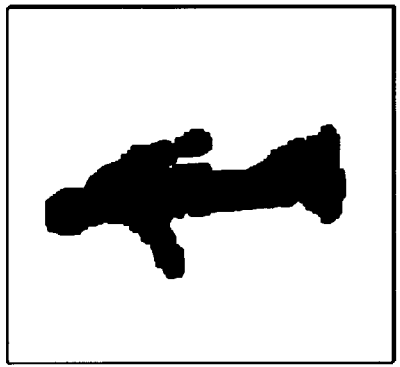
FIG. 2F
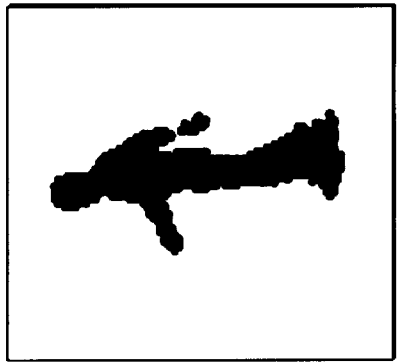
FIG. 2E

METHOD AND APPARATUS FOR MAPPING A LOCATION FROM A VIDEO IMAGE TO A MAP

This application claims priority of 60/083,711 filed Apr. 30, 1998.

TECHNICAL FIELD OF THE INVENTION

This invention relates in general to monitoring systems and, more particularly, to a method and apparatus for mapping the physical position of an object from a video image to a map of a monitored area.

BACKGROUND OF THE INVENTION

A surveillance or monitoring system may include a video camera which generates images of a monitored area or region, and a computer which receives and processes the images from the video camera. The computer includes a digitized map, and monitors the detected video images in order to determine the presence in the monitored area of an object of interest, such as a human. When an object of interest is identified through analysis of the detected images, the location of the object is mapped from the image to the map.

This known system includes a computer-aided drafting (CAD) model of the environment or monitored area, which serves as the basis for the map. Further, in order to accurately determine the location on the map of an object identified in the detected images, parameters of the camera must be determined, and must be introduced into the computer. The camera parameters include not only internal parameters such as focal length and the number of millimeters per pixel, but also external parameters such as the location and the orientation of the camera.

When this known system is in operation, the location on the map of an object in a video image is determined using a formula derived by inverting equations that describe image formation geometry. The necessary set up and initialization for this system is complex and time consuming. Determining all of the pertinent internal and external parameters of the camera, and entering them into the computer system, is a complex and time-consuming task. Also, preparing the CAD model of the monitored area can be a slow and time-consuming task.

In addition, even if care is exercised in the determination of the camera parameters and the preparation of the CAD model, errors can still occur. For example, an object which is visible to the camera, because it is on a side of a wall nearest the camera, may be incorrectly positioned on the map on the opposite side of that wall, where it would not actually be visible to the camera. Errors of this type become even more problematic if the camera parameters and CAD model are not carefully established.

SUMMARY OF THE INVENTION

From the foregoing, it may be appreciated that a need has arisen for a method and apparatus for mapping an object in a detected image to a map of the monitored area, which permit the mapping function to be easily and rapidly defined with minimal possibility for error, while avoiding the need to obtain and input both internal and external camera parameters.

According to the present invention, a method and apparatus are provided to address this need, and involve: providing a map of a monitored area; detecting a reference image of the area; identifying a first region which corresponds to a selected portion of the area as viewed in the reference image; identifying a second region which corresponds to the selected portion as viewed on the map; detecting a further image of the area; identifying a portion of the further image corresponding to an object of interest; selecting in the region of the lower end of the portion of the further image a first point which is within the first region; and carrying out a warp transformation of the first point from the first region to the second region, in order to identify within the second region a second point which corresponds to the first point and which identifies a position on the map of the object of interest.

BRIEF DESCRIPTION OF THE DRAWINGS

A better understanding of the present invention will be realized from the detailed description which follows, taken in conjunction with the accompanying drawings, in which:

FIG. 1 is a block diagram of a monitoring system which embodies the present invention;

FIGS. 2A, 2B, 2C, 2D, 2E, 2F, 2G and 2H are diagrammatic views of two-dimensional images that represent successive steps carried out by the system of FIG. 1 when processing images obtained from a video camera;

FIG. 3 is a motion analysis diagram indicating how the motion of objects in a video image is analyzed by the system of FIG. 1;

FIG. 8 is a diagrammatic view of an event selection box which is displayed by the system of FIG. 1 in order to permit an operator to identify events which are to be detected by the system.

DETAILED DESCRIPTION OF THE INVENTION

Figure 4:
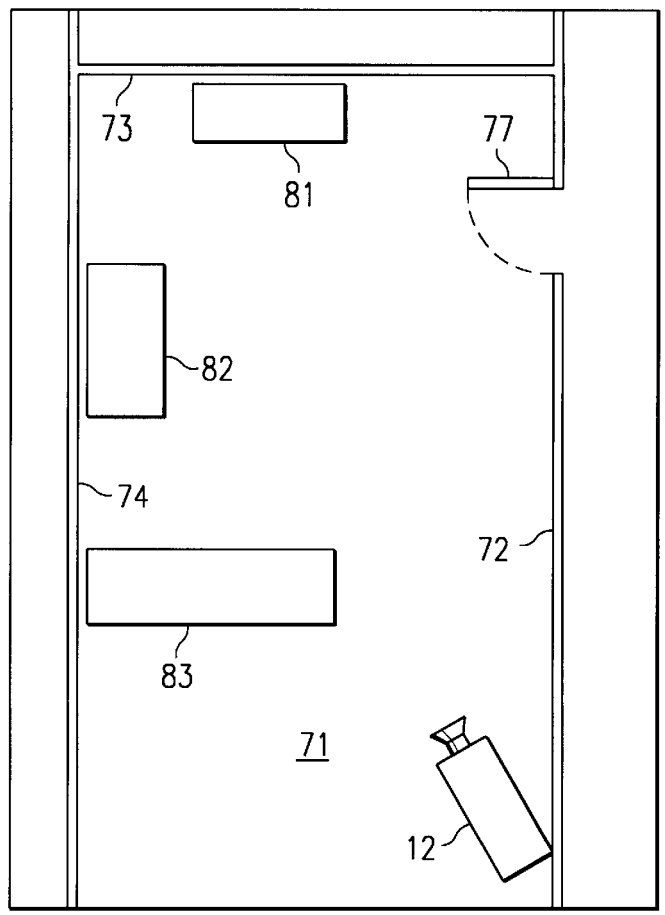
FIG. 4 is a diagrammatic top view of part of a floor plan of a building in which the system of FIG. 1 can be utilized.

FIG. 1 is a diagrammatic view of a surveillance or monitoring system 10 which embodies the present invention, and which is used monitor activity in a selected region or area. The system 10 includes a video camera 12, which in the disclosed embodiment is a known camera that outputs gray-scale images. However, the present invention may be utilized with a color video camera, or some other type of image detector.

The monitoring system 10 also includes a computer 16, which is coupled at 17 to an output of video camera 12, so as to receive video images generated by an image detector in the video camera 12. The computer 16 is associated with a keyboard 18, a mouse 19, and a display or monitor 21. The keyboard 18, mouse 19 and display 21 serve as an operator input/output apparatus.

The initial processing of video images by the computer 16 will now be described with reference to FIGS. 2A–2H and FIG. 3. More specifically, FIG. 2A is a diagrammatic view of a video image produced by the video camera 12 when it is directed toward an area which, in this example, has arbitrarily been selected to be the corner of a room. The video image of FIG. 2A is saved as a reference image. FIG. 2B is a similar video image that was obtained from the camera 12 at a later point in time, after an object 41 has been introduced into the monitored area. In this case, the object 41 is a person, who has walked into the corner of the room and thus into the field of view of the video camera 12. The video camera 12 is stationary, and thus the single difference between the images of FIGS. 2A and 2B is the presence of the person 41 in FIG. 2B. The presence and movement of the person 41 is detected in the following manner.

First, the gray-scale image of FIG. 2B is subtracted from the gray-scale image of FIG. 2A, on a pixel-by-pixel basis. The absolute value of the difference for each pixel is then determined, and the result is the gray-scale difference image of FIG. 2C. Then, the difference image of FIG. 2C is sub-sampled in order to reduce the number of pixels, for example to a 128 by 128 or 256 by 256 pixel image. The resulting low-resolution image is shown in FIG. 2D. It will be recognized that it is alternatively possible to sub-sample each of the images of FIGS. 2A and 2B before determining the difference and absolute value for each pixel, which reduces the number of pixels that need to be processed, and therefore reduces the amount of time needed to obtain the image of FIG. 2D.

The low-resolution difference image of FIG. 2D is then thresholded. In other words, the gray-scale value for each pixel in the image of FIG. 2D is compared to a predetermined threshold, and the pixel is then set to be either on or off (black or white), depending on whether the value is above or below the threshold. The resulting threshold image is shown in FIG. 2E. Each pixel in the threshold image of FIG. 2E can be represented by a binary "1" or a binary "0", depending on whether the pixel is considered to be on or off.

Morphological processing is then carried out on each pixel of the threshold image of FIG. 2E, by first performing a dilate operation, and then performing an erode operation. More specifically, each pixel is processed by viewing it as the center pixel in a three-by-three matrix of pixels. During the dilate operation for each pixel in the threshold image of FIG. 2E, if any one of the eight neighboring pixels in that image is a logic "1", the pixel of interest is set to a logic "1". The resulting dilate image is shown in FIG. 2F. During the subsequent erode operation for each pixel in the dilate image of FIG. 2F, if any one of the eight neighboring pixels in that image is a logic "0", then the pixel of interest is set to a logic "0". The result is the erode image of FIG. 2G.

The erode image of FIG. 2G is then analyzed to identify each region of contiguous logic "1" pixels. Each such region of contiguous logic "1" pixels represents a change region, corresponding to an object which has been introduced into the image of FIG. 2B and which was not present in the image of FIG. 2A, such as the person 41. This analysis can be carried out using known techniques, such as run-length encoding followed by connected-component analysis.

With respect to each detected change region, the image processing section 27 determines a bounding box for the change region. An example of a bounding box is shown at 43 in FIG. 2H. It will be noted that the bounding box 43 is a rectangular box, just large enough to contain the entire change region. That is, no pixel of the change region lies outside the box, but every side of the box touches at least one pixel of the change region.

The above-described image processing is carried out for each image in a succession of images provided by the video camera 12. That is, each of these successive images is processed with respect to the reference image of FIG. 2A, in the same manner that was described above for the image of FIG. 2B.

The computer 16 then carries out motion analysis, by tracking movement or non-movement of each identified change region through a succession of the frames or images from the video camera. For purposes of facilitating an understanding of the present invention, one known motion analysis technique will be briefly summarized with reference to FIG. 3. Although it will be recognized that motion analysis in the video images is carried out in two dimensions, for purposes of convenience the diagram of FIG. 3 shows just one dimension.

In FIG. 3, the nineteen vertical lines F0 through F18 each represent a respective frame or image in a series of successive images from the video camera 12. In FIG. 3, the horizontal dimension represents time, and the vertical dimension represents one dimension of movement of an object within a two-dimensional image. When an object which was not previously present first appears, for example at 51 or 52, it is identified as an "entrance" or "enter" event. When an object which was previously present is found to no longer be present, for example at 53 or 54, it is designated an "exit" event. If an existing object splits into two objects, one of which is moving and the other of which is stationary, for example as at 57, it is designated a "deposit" event. This would occur, for example, when a person who is carrying a briefcase sets it down on a table, and then walks away.

If a moving object merges with a stationary object, and then continues to move while the stationary object disappears, as at 58, it is designated a "remove" event. This would correspond to a situation where a person walks to a notebook resting on a table, and then picks up the notebook and walks away. Three other types of events, which are not specifically illustrated in FIG. 3, are a "rest" event, a "move" event, and a "lightsout" event. A rest event occurs when a moving object comes to a stop but continues to be present without moving. A practical example is a situation where the objects being monitored are vehicles in a parking lot, and a car pulls into a parking space and thereafter remains stationary. A move event occurs when a detected object which has been stationary begins moving again, for example when a car that has been parked begins moving. A "lightsout" event occurs when the entire detected image suddenly changes, for example when the lights in a monitored room are turned out and the room becomes dark. A "lightsout" event can be detected without all of the image processing described above in association with FIGS. 2 and 3.

It is optionally possible to also carry out an identification analysis, in an attempt to identify a detected object. For example, with a small amount of knowledge about the topography of the monitored area, the computer 16 can use the position in the image of the midpoint of the lower side of the object's bounding box in order to identify how far the object is from the camera. Then, knowing how tall a person that far from the camera would be, the computer 16 can evaluate the vertical height of the bounding box in the image, in order to determine whether the object generating the change region is tall enough to be a person. If the object is sufficiently tall to be a person, it can be assumed that it is a person.

Alternatively, the computer could map the endpoints of the lower side of a bounding box from the image 84 to the map 85. Given the scale of the map 85, the computer 16 could determine the distance between these two points on the map 85, which would also be the distance between them in the image 84, and would thus be the length of the lower side of the bounding box in the image. The computer could then determine the height of the bounding box in the image 85, and evaluate whether the object in question is tall enough to be a person. Again, if the object is sufficiently tall to be a person, the computer 16 assumes that it is a person.

If the object is not sufficiently tall to be a person, then the computer 16 can carry out an object analysis procedure, by analyzing the image of the object in an attempt to classify it as one of several common objects, such as a briefcase, a notebook, a box, or a computer monitor. If the object is not specifically identified through this approach, then it is ultimately identified as an "unknown" object.

In order to facilitate an understanding of the present invention, a specific exemplary application for the system 10 of FIG. 1 will now be disclosed. However, it will be recognized that there are numerous other applications and environments in which the system 10 of FIG. 1 could be utilized. With respect to the exemplary application, FIG. 4 is a diagrammatic top view of a portion of a room 71 within a building, including three walls 72, 73 and 74. A door 77 is provided in the wall 72 at a location near the wall 73, and swings into the room 71 when opened. Three tables 81–83 are provided in the room, the table 81 being adjacent the wall 73, the table 82 being adjacent the wall 74, and the table 83 having one end adjacent the wall 74. The video camera 12 is supported on the wall 72, and is directed toward the corner of the room which is defined by the intersection of walls 73 and 74.

Figure 5:
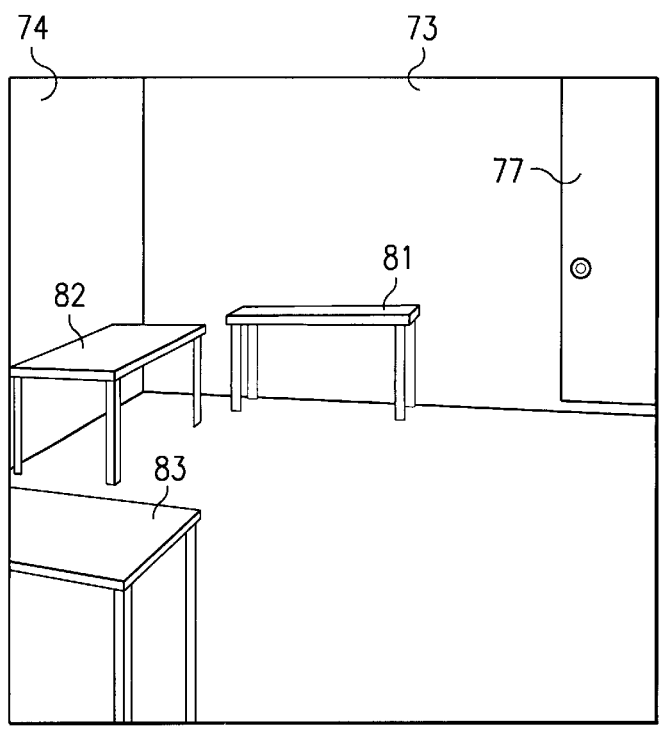
FIG. 5 is a diagrammatic view of a reference video image provided by the system of FIG. 1 for the building of FIG. 4.

FIG. 5 is a diagrammatic view of a video image which was obtained from the video camera 12 in the environment of FIG. 4, and which thus shows the door 77, and portions of the walls 73 and 74. The image of FIG. 5 also shows the tables 81 and 82, and a portion of the table 83. For purposes of discussion, it is assumed that the image of FIG. 5 has been saved as a reference image, analogous to the reference image discussed above in association with FIG. 2A.

Figure 6:
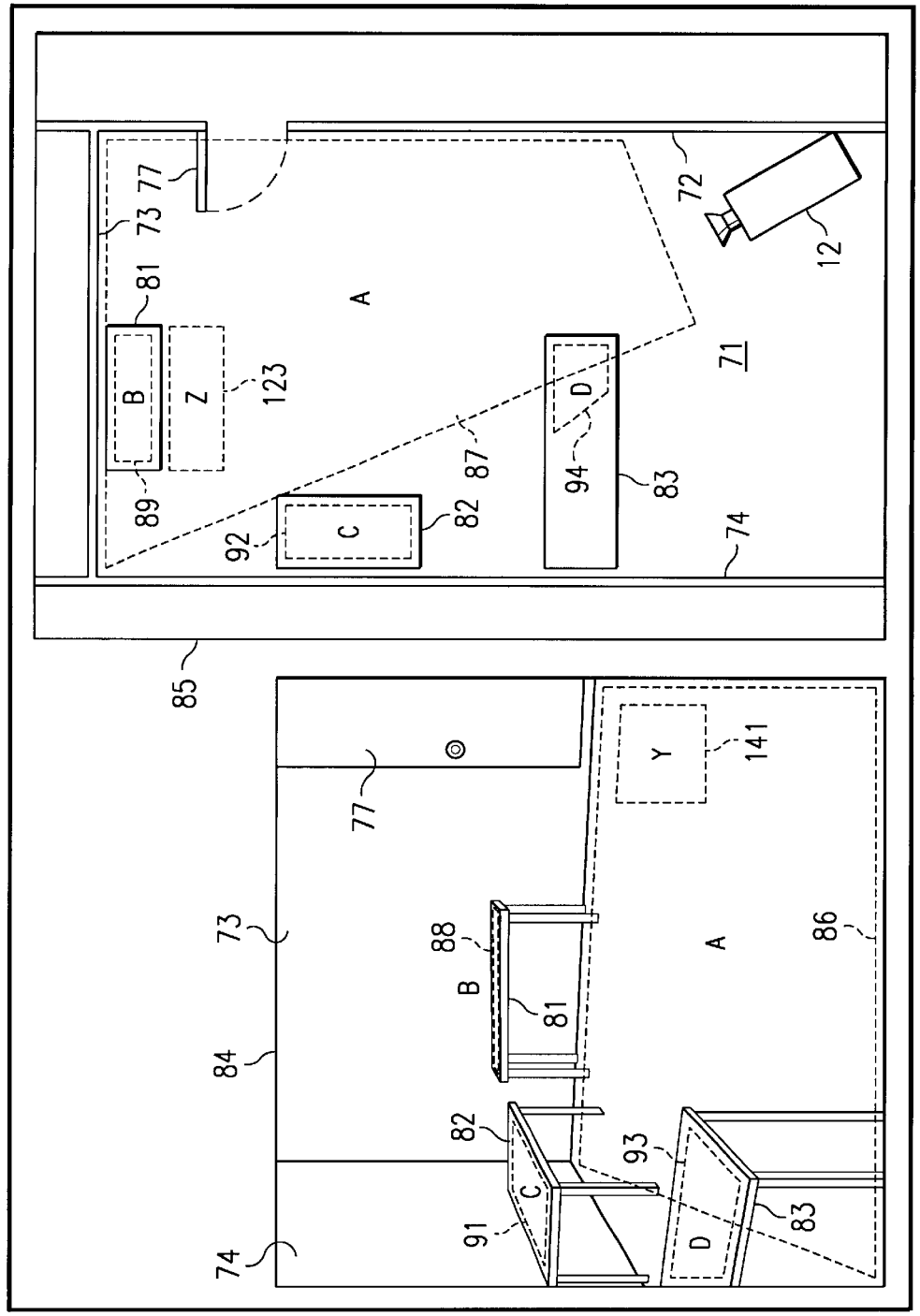
FIG. 6 is a diagrammatic view of part of a video display provided by the system of FIG. 1 to permit a operator to define a mapping function between a detected video image of the monitored area and a map of the monitored area.

FIG. 6 is a diagrammatic view of a portion of the screen of the display 21 (FIG. 1). On the left is an image 84, which in FIG. 6 is the reference image shown in FIG. 5. On the right is a map 85, which is a digitized image of the top view of the room 71 from FIG. 4. In the disclosed embodiment, the image 85 was introduced into the computer using a not-illustrated scanner to digitize a blueprint or drawing. The computer 16 is not cognizant of physical structure within the map 85, such as the walls 71–74 or the tables 81–83. Instead, the computer 16 sees the map 85 as simply a two-dimensional image defined by an array of pixels.

The video image 84 and the map 85 are thus just respective arrays of pixels to the computer 16. In order to give the computer a basis for interrelating them, a mapping is established between the image 84 and the map 85, in the following manner. With reference to FIG. 6, an operator uses the mouse 19 (FIG. 1) to define one or more quadrilateral regions on each of the image 84 and the map 85. Each quadrilateral region is used to designate an upwardly facing surface that can support a person or an object, such as the floor, or the top surface of a table.

For example, the operator may first draw a quadrilateral region 86 on the image 84 of FIG. 6. The quadrilateral region 86 corresponds to most of the floor that is visible in the image 84. The operator may draw the quadrilateral region 86 by clicking the mouse at selected points on the image 84, in order to define the four corners of the quadrilateral region. An outline of the quadrilateral region 86 is overlaid on the displayed image 84. In FIG. 6, the outline of the quadrilateral region 86 is represented by a broken line, but it could alternatively be a solid line, and/or could be displayed in a color so as to be easily visible on the gray-scale image 84.

The operator then assigns the quadrilateral region 86 a label, which in FIG. 6 is the letter "A" shown in the middle of the quadrilateral region 86. Alternatively, the operator could have used the name "FLOOR" for the quadrilateral region 86, because it represents a portion of the floor. Then, as accurately as possible, the operator draws on the map 85 a corresponding quadrilateral region 87, which represents exactly the same portion of the floor. Although the quadrilateral regions 86 and 87 represent the same portion of the floor, they have different sizes and shapes, due to the fact that the image 84 is a perspective view of the room, and the map 85 is a top view. The operator gives to the quadrilateral region 87 the same label "A" which was used for the quadrilateral region 86, so that the computer 16 will recognize that the quadrilateral regions 86 and 87 correspond to each other. After a quadrilateral region has been drawn, the computer 16 allows the operator to adjust the shape and/or size of the quadrilateral region, for example by using the mouse 19 to drag and drop a side or a corner of the quadrilateral region.

In a similar manner, the operator may draw additional pairs of quadrilateral regions. For example, in FIG. 6, the operator has drawn on the image 84 a quadrilateral region 88, which designates the top surface of the table 81, and has drawn a corresponding quadrilateral region 89 on the map 85. The operator has given these two related quadrilateral regions the label "B". Further, the operator has drawn associated quadrilateral regions 91 and 92 in order to designate the top surface of the table 82, and has given them both the label "C". In addition, the operator has drawn on the image 84 a quadrilateral region 93, which represents the portion of the top surface of table 83 that is visible in the image 84, and has drawn a corresponding quadrilateral region 94 on the map 85. The quadrilateral regions 93 and 94 have been given a common label "D".

For each pair of corresponding quadrilateral regions drawn by the operator, the computer 16 sets up a warp transformation which uses a known mathematical technique, and which translates a selected point in one of the quadrilateral regions of the pair to a corresponding point in the other quadrilateral region of the pair. In order to permit the system to determine this warp transformation, the computer 16 must know which side of a given quadrilateral region in the image 84 corresponds to which side of an associated quadrilateral region on the map 85. In the disclosed embodiment, the computer 16 allows the operator to identify the location of the camera 12 on the map 85. The computer 16 then automatically associates the side of a quadrilateral region which is lowest in the image 84 to the side of the corresponding quadrilateral region on the map 85 which is closest to the camera 12. However, it would alternatively be possible to ask the operator to manually identify related sides of the quadrilateral regions of each pair, for example by using the mouse 19 to click on a selected side of one quadrilateral region, and then using the mouse to click on the corresponding side of the other quadrilateral region.

Although the present discussion refers to the use of quadrilateral regions, it will be recognized that outlines of other shapes could be used. For example, an outline could have the shape of some other polygon or a circle, or could be an irregular outline, so long as an appropriate warp transformation is provided to relate each point in one region to a point in the corresponding region.

The operator may sometimes find it necessary to draw quadrilateral regions which overlap. For example, in FIG. 6, the quadrilateral region 93 representing the top of table 83 overlaps with a portion of the quadrilateral region 86 designating the floor of the room. In the event that a particular point in the image 84 is disposed within both of these quadrilateral regions, the computer 16 must know whether to map the point from the image 84 to the map 85 using the warp transformation for the quadrilateral regions 93 and 94, or the warp transformation for the quadrilateral regions 86 and 87. Therefore, wherever two quadrilateral regions overlap in the image 84, the computer 16 needs to know which of the two quadrilateral regions is to be given priority over the other.

In the disclosed embodiment, the computer 16 automatically assumes that the smallest quadrilateral region has priority. Thus, in the image 84 of FIG. 6, the quadrilateral region 93 would be given priority over the quadrilateral region 86. In other words, if a given point fell within the overlap between the quadrilateral regions 93 and 86, the point would be translated to map 85 using the warp transformation for quadrilateral regions 93 and 94, rather than the warp transformation for quadrilateral regions 86 and 87. This default priority scheme works relatively well in practice, because a larger quadrilateral region (such as quadrilateral region 86) usually represents a portion of the floor, whereas a smaller quadrilateral region (such as quadrilateral region 93) usually represents a top surface of a table or some other object resting on the floor. The table top will normally be visible to the video camera, but will obscure a portion of the floor from the view of the camera. Thus, where two quadrilateral regions overlap, assigning the area of overlap to the smaller quadrilateral region, rather than the larger quadrilateral region, will normally achieve a result that corresponds to what is visible to the camera and what is not. However, there may be circumstances in which the operator may wish to specify a different priority as to a given region of quadrilateral region overlap, and computer 16 permits the operator to manually enter prioritization information that takes precedence over the default prioritization.

After the operator has drawn at least one pair of corresponding quadrilateral regions in the image 84 and the map 85, and has defined the priority for any region of overlap, the system 10 may be placed in a mode of normal monitoring operation. Successive images from the video camera 12 are processed relative to the reference image of FIG. 5, in a manner analogous to that described above in association with FIGS. 2 and 3. In this regard, FIG. 7 is a diagrammatic view similar to FIG. 6, except that the displayed video image is a current video image 101 rather than the stored reference image of FIG. 5.

Figure 7:
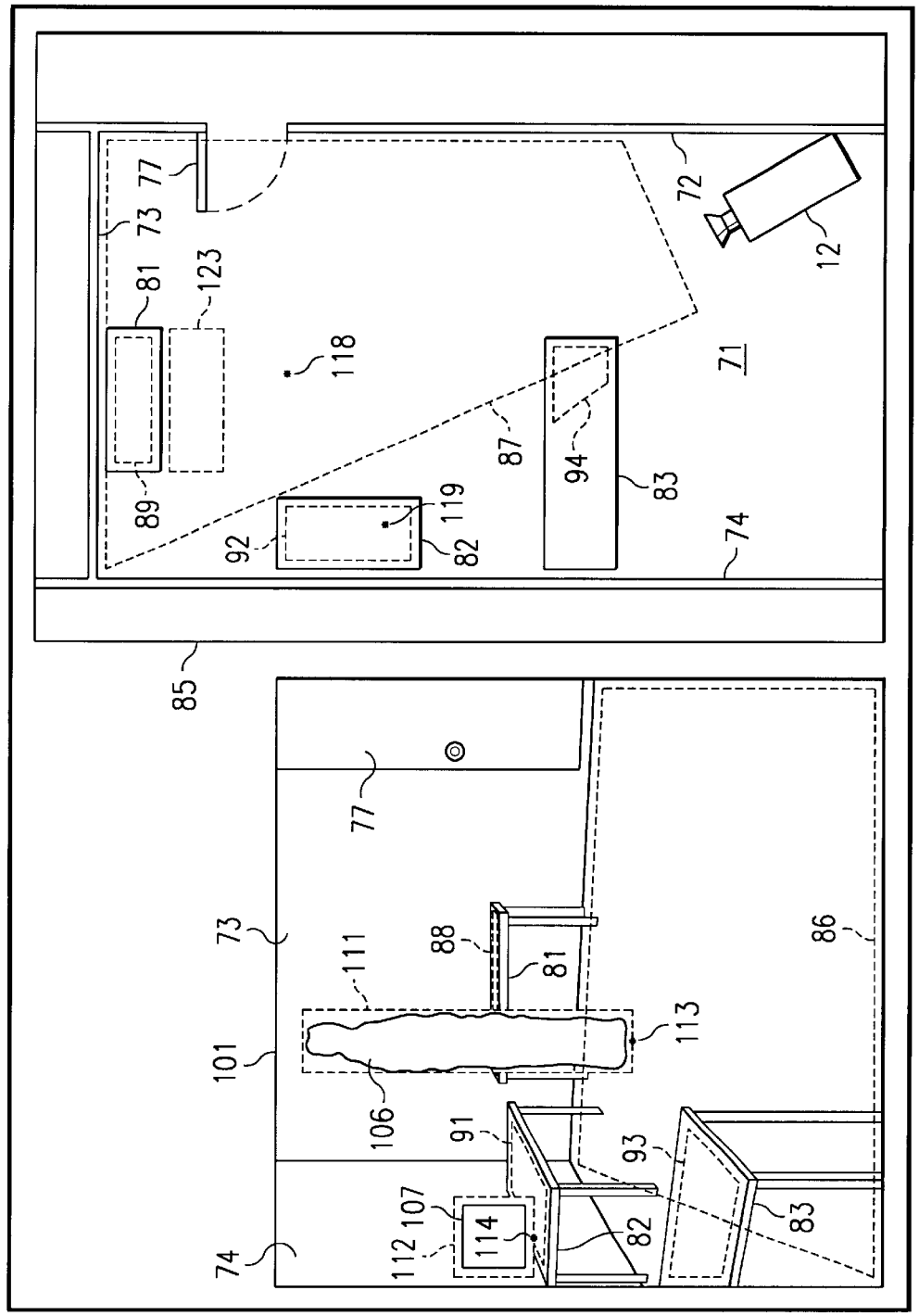
FIG. 7 is a diagrammatic view similar to FIG. 6 but showing a exemplary display generated by the system of FIG. 1 during normal operation.

In FIG. 7, the current video image 101 reflects that a person 106 entered the room while carrying an object 107, placed the object 107 on the top surface of the table 82, and then started to walk away from the object 107. The object 107 may, for example, be a briefcase or a box. The bounding box for the person 106 is shown at 111, and the bounding box for the object 107 is shown at 112. The midpoints of the lower sides of the bounding boxes 111 and 112 are respectively shown at 113 and 114.

The midpoint 113 is disposed within the quadrilateral region 86, and the warp transformation for quadrilateral regions 86 and 87 is therefore used to map the point 113 from the quadrilateral region 86 into a corresponding point 118 within the quadrilateral region 87 of the map 85. A symbol such as a dot is displayed on the map 85 at the point 118, in order to provide on the map 85 a visible indication of where the person 106 is standing within the room. The midpoint 114 is disposed within the quadrilateral region 91, and the warp transformation associated with quadrilateral regions 91 and 92 is therefore used to map the point 114 to a corresponding point 119 on the map 85. A dot is displayed at the point 119 on the map 85, in order to indicate where on the map 85 the object 107 is located. As the person 106 moves around within the room, the dot 118 representing the person will move on the map 85, in order to provide an accurate indication where in the room the person is currently located.

If the person 106 moves to a location where the point 113 is outside each of the quadrilateral regions 86, 88, 91 and 93 in the image 101 of FIG. 7, then the point 113 will not be mapped to the map 85 until it is again within one of these four quadrilateral regions. Consequently, the dot 118 will not be displayed on the map 85 so long as the point 113 is outside these quadrilateral regions on the image 101.

Referring back to FIG. 6, the computer 16 allows the operator to also define one or more additional quadrilateral regions, one of which is shown at 123 on the map 85. The quadrilateral region 123 appears only on the map 85, and has no corresponding quadrilateral region on the image 84. The operator gives the quadrilateral region 123 a unique label, for example the label "Z". Referring again to FIG. 7, the quadrilateral region 123 can be used to check for certain events. For example, if the computer 16 determines that the point 118 has moved to a location on the map which is within the quadrilateral region 123, the computer 16 could take some special action, such as producing an audible alarm. In a variation of this example, the computer 16 might not produce an audible alarm immediately after the point 118 enters the quadrilateral region 123, but only if the point 118 remains within the quadrilateral region 123 for a specified period of time, which may be referred to as a "loiter" event.

FIG. 8 is a diagrammatic view of an event selection box 136 that can be presented on the display 21 of FIG. 1, for example in conjunction with the portion of the display screen which is shown in FIG. 6. An operator can use the event selection box 136 to specify that the computer 16 is to check for a certain event, and to indicate what action is to be taken if the specified event occurs.

In this regard, the operator can use a mouse to select one of several events identified in box 136, including an enter event, an exit event, a loiter event, a deposit event, a remove event, a move event, a rest event, and a lightsout event. The event selection box 136 allows the operator to optionally restrict the monitoring for the specified event to certain types of detected objects, including a person, a box, a briefcase, a notebook, a computer monitor, any type of object, or just an unknown object. Event selection box 136 also allows the operator to restrict the monitoring event to a particular region by identifying its label letter, such as the region 123 identified in FIG. 6 by the label letter "Z".

For certain events, the event selection box 136 allows the operator to specify a time duration in seconds. For example, if the operator is instructing the system to monitor for a loiter event within a specified region, the operator may specify that the loiter event is to be detected only if the specified object remains within the specified region for a period of at least five seconds. The event selection box 136 also allows the operator to specify the action to be taken if the specified event occurs, including an audible beep, the creation of a log entry on a hard disk drive of computer 16, a pop-up window on the display 21 of the workstation 13, or a synthesized voice announcement indicating that the event of interest has occurred (such as a synthesized announcement of the word "loiter").

It will be recognized that the event selection box 136 could be modified to allow the identification of other events, objects, conditions, or actions. For example, actions could also include making a phone call to a specified telephone number such as that of a security agency, or sending an electronic mail message to a specified electronic mail address.

Referring again to FIG. 6, the computer 16 allows the operator to also define one or more additional quadrilateral regions, one of which is shown at 141 on the reference image 84. The quadrilateral region 141 appears only on the reference image 84, and has no corresponding quadrilateral region on the map 85. The operator gives the quadrilateral region 141 a unique label, for example the label "Y". This type of quadrilateral region is used to limit mapping of points from the image 84 to the map 85. More specifically, if a detected change region falls completely within the quadrilateral region 141, the change region is completely ignored for all purposes, and thus no point is mapped from the image 84 to the map 85 as a result of that detected change region. On the other hand, if only a portion of a detected change region falls within the quadrilateral region 141, then that change region is handled in a normal manner, as previously described. This capability is provided to allow certain types of activity in a monitored area to be intentionally ignored.

More specifically, as one example, if a computer printer was located within the monitored area, each time the printer ejected a sheet of paper, the system 10 would normally detect and log this event. Similarly, if an unattended computer monitor was within the monitored area and had a screen-saver displayed, the system 10 would normally detect and log display changes caused by the screen saver program. By placing the quadrilateral region 141 around the printer, or around the computer monitor, all activity associated with the printer or monitor would occur entirely within the quadrilateral region 141, and would thus be ignored. Consequently, ejection of paper from the printer or changes in the display of the monitor would be ignored, so that the system 10 would not log numerous events which were of little or no interest. In FIG. 6, the quadrilateral region 141 is within the quadrilateral region 86. If a detected change region is entirely within the quadrilateral region 141, it will be completely ignored even though it is also within the quadrilateral region 86.

The present invention provides a number of technical advantages. One such technical advantage is that a system operator can rapidly and accurately define the mapping between a video image and a site map. So long as the operator is reasonably careful to draw accurate quadrilateral regions, mapping errors can be substantially eliminated. For example, an object detected in the video image will not be incorrectly located on the wrong side of a wall. A further advantage is that this can be accomplished without any need to define camera parameters, including internal parameters such as focal length and millimeters per pixel, and external parameters such as the location and orientation of the camera. This is all automatically taken into account.

Although one embodiment has been illustrated and described in detail, it should be understood that various changes, substitutions and alterations can be made therein without departing from the scope of the present invention. For example, although the disclosed embodiment uses quadrilaterals to define regions of interest on the displayed image and/or map, it will be recognized that other shapes could alternatively be used to define regions. Also, the disclosed embodiment uses a video camera which has a detector responsive to visual light, but it will be recognized that other types of detectors could alternatively be used, such as a staring array infrared detector. Further, the foregoing disclosure discusses an exemplary application for the disclosed embodiment, but it will be recognized that there are numerous other applications and environments in which the disclosed system could also be used. Other changes, substitutions, and alterations are possible without departing from the spirit and scope of the present invention, as defined by the following claims.

What is claimed is:

1. A method of monitoring, comprising the steps of:
   providing a map of a monitored area;
   detecting a reference image of the monitored area;
   receiving operator input identifying a first region which corresponds to a selected portion of the monitored area as viewed in the reference image;
   receiving operator input identifying a second region which corresponds to the selected portion as viewed on the map;
   defining warp transformation parameters for translating a selected point in the first region into a corresponding point in the second region;
   detecting a further image of the area;
   identifying a portion of the further image corresponding to an object of interest;
   selecting a first point near a lower end of the portion of the further image which corresponds to the object of interest, the first point being within the first region; and
   carrying out a warp transformation of the first point from the first region to the second region according to the defined warp transform parameters in order to identify within the second region a second point which corresponds to the first point and which identifies a position on the map of the object of interest.

2. A method according to claim 1, including the step of providing on the map a visible indicator corresponding to the position of the object of interest.

3. A method according to claim 1, wherein said selecting step is carried out by determining a bounding box just large enough to contain the entire portion of the further image corresponding to the object of interest, and selecting as the first point a midpoint of a lower side of the bounding box.

4. A method according to claim 1, wherein:
   said step of identifying a portion of the further image corresponding to the object of interest includes the step of comparing the further image to the reference image and identifying on a pixel-by-pixel basis the difference between the further image and the reference image.

5. A method according to claim 1, wherein the reference image and the further image are video images.

6. A method according to claim 1, including the steps of identifying a third region on the map, detecting whether the second point satisfies a predetermined condition with respect to the third region, and taking a predetermined action if the second point satisfies the predetermined condition with respect to the third region.

7. A method according to claim 1, wherein:
   said step of identifying the first region includes:
      generating a visual display of the reference image;
      receiving operator input defining a plurality of first corners on the visual display of the reference image;
      identifying the first region as a polygon having the plurality of first corners; and
      generating a visual display having a first outline corresponding to the first region overlaid on the reference image; and said step of identifying the second region includes:
  generating a visual display of the map;
  receiving operator input defining a plurality of second corners on the visual display of the map;
  identifying the second region as a polygon having the plurality of second corners; and
  generating a visual display having a second outline corresponding to the second region overlaid on the map.

8. A method according to claim 7, wherein:
said first outline consists of broken lines connecting said first corners; and
said second outline consists of broken lines connecting said second corners.

9. A method according to claim 7, wherein:
said first outline consists of solid lines connecting said first corners; and
said second outline consists of solid lines connecting said second corners.

10. A method according to claim 7, wherein:
said first outline consists of displaying said first region in a predetermined color; and
said second outline consists of displaying said second region in said predetermined color.

11. A method according to claim 7, wherein:
said step of identifying the first region further includes receiving operator input adjusting the first region; and
said step of identifying the second region further includes receiving operator input adjusting the second region.

12. A method according to claim 11, wherein:
said step of receiving operator input adjusting the first region includes receiving operator input via a pointing device to drag and drop a corner of the first region; and
said step of receiving operator input adjusting the second region includes receiving operator input via a pointing device to drag and drop a corner of the second region.

13. A method according to claim 11, wherein:
said step of receiving operator input adjusting the first region includes receiving operator input via a pointing device to drag and drop a side of the first region; and
said step of receiving operator input adjusting the second region includes receiving operator input via a pointing device to drag and drop a side of the second region.

14. A method of monitoring, comprising the steps of:
providing a map of a monitored area;
detecting a reference image of the area;
identifying a first region which corresponds to a first portion of the area as viewed in the reference image;
identifying a second region which corresponds to the first portion as viewed on the map;
identifying a third region which corresponds to a second portion of the area as viewed in the reference image, and which has a portion that overlaps a portion of the first region;
identifying a fourth region which corresponds to the second portion as viewed on the map;
selecting one of the first and third regions to have priority over the other thereof;
detecting a further image of the area;
identifying a portion of the further image corresponding to an object of interest;
selecting a first point near a lower end of the portion of the further image which corresponds to the object of interest;
determining whether the first point is within the selected one of the first and third regions, and carrying out a warp transformation of the first point from the selected one of the first and third regions to the corresponding one of the second and fourth regions if the first point is within the selected one of the first and third regions; and
determining whether the first point is outside the selected one of the first and third regions and within the other thereof, and carrying out a warp transformation of the first point from the nonselected one of the first and third regions to the corresponding one of the second and fourth regions.

15. A method according to claim 14, wherein said step of defining priority includes the step of automatically selecting the smaller of the first and third regions to have priority over the larger thereof.

16. A method according to claim 14, including the step of providing on the map a visible indicator which corresponds to the position of the object of interest.

17. A method according to claim 14, wherein said steps of generating the first, second, third and fourth regions include the steps of overlaying outlines of the first and third regions on the reference image, and overlaying outlines of the second and fourth regions on the map.

18. A monitoring apparatus, comprising:
an image detector which outputs a succession of images of a monitored area; and
a computer system which receives the images from the image detector, which saves one of the detected images as a reference image, which has information therein representing a map of the monitored area, which has an operator input/output section, and which is operative to:
permit an operator to define a first region via the operator input/output section which corresponds to a selected portion of the area as viewed in the reference image;
permit the operator to define a second region via the operator input/output section which corresponds to the selected portion as viewed on the map;
computing warp transformation parameters for translating a selected point in the first region into a corresponding point in the second region;
compare the reference image with a subsequent image to identify an object of interest in the monitored area;
select a first point near a lower end of the portion of the subsequent image which corresponds to the object of interest, the first point being in the first region; and
carry out a warp transformation of the first point from the first region to the second region according to the computed warp transform parameters in order to identify within the second region a second point which corresponds to the first point and which identifies the position on the map of the object of interest.

19. A monitoring apparatus according to claim 18, wherein said computer system is further operative to display on the map a visible indicator corresponding to the position of the object of interest.

20. A monitoring apparatus according to claim 18, wherein said computer system is operative to facilitate the definition of the first region by visually displaying the reference image, by permitting the operator to identify the first region on the reference image, and by overlaying an outline of the first region on the displayed reference image.

21. A monitoring apparatus according to claim 18, wherein said computer system is operative to facilitate the definition of the second region by visually displaying the map, by permitting the operator to identify the second region on the map, and by overlaying an outline of the second region on the displayed map.

22. A method of monitoring, comprising the steps of:

providing a map of a monitored area;

detecting a reference image of the monitored area;

receiving operator input identifying a first region which corresponds to a selected portion of the monitored area as viewed in the reference image;

receiving operator input identifying a second region which corresponds to the selected portion as viewed on the map;

defining warp transformation parameters for translating a selected point in the first region into a corresponding point in the second region;

detecting a further image of the area;

identifying a portion of the further image corresponding to an object of interest;

selecting a first point near a lower end of the portion of the further image which corresponds to the object of interest, the first point being within the first region;

carrying out a warp transformation of the first point from the first region to the second region according to the defined warp transform parameters in order to identify within the second region a second point which corresponds to the first point and which identifies a position on the map of the object of interest; and receiving operator input identifying a third region which corresponds to a selected portion of the monitored area as viewed in the reference image, the third region being at least partially within the first region; and inhibiting said step of carrying out the warp transformation if the portion of the further image corresponding to the object of interest is completely within the third region.

* * * * *